(12) United States Patent
Li et al.

(10) Patent No.: US 10,681,084 B2
(45) Date of Patent: Jun. 9, 2020

(54) METHOD AND DEVICE FOR APPLICATION INFORMATION RISK MANAGEMENT

(71) Applicant: Alibaba Group Holding Limited, George Town (KY)

(72) Inventors: Lizhong Li, Hangzhou (CN); Yanan Zhang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 89 days.

(21) Appl. No.: 15/971,386

(22) Filed: May 4, 2018

(65) Prior Publication Data
US 2018/0255097 A1 Sep. 6, 2018

Related U.S. Application Data

(63) Continuation of application No. PCT/CN2016/103489, filed on Oct. 27, 2016.

(30) Foreign Application Priority Data

Nov. 5, 2015 (CN) .......................... 2015 1 0746296

(51) Int. Cl.
*G06F 21/00* (2013.01)
*H04L 29/06* (2006.01)
(Continued)

(52) U.S. Cl.
CPC ...... *H04L 63/1483* (2013.01); *G06F 16/2365* (2019.01); *G06F 16/951* (2019.01); *G06F 21/53* (2013.01); *G06F 21/57* (2013.01); *H04L 63/145* (2013.01); *H04L 63/1433* (2013.01); *H04L 63/1491* (2013.01); *H04W 4/12* (2013.01); *H04W 4/14* (2013.01); *H04W 12/12* (2013.01)

(58) Field of Classification Search
CPC .... G06F 21/577; G06F 21/6218; G06F 21/62; G06F 21/53; G06F 2221/2113
See application file for complete search history.

(56) References Cited

U.S. PATENT DOCUMENTS

2006/0101514 A1* 5/2006 Milener ................. G06F 21/51
726/22
2008/0082662 A1 4/2008 Dandliker et al.
(Continued)

FOREIGN PATENT DOCUMENTS

| CN | 102801706 | 11/2012 |
|---|---|---|
| CN | 103118026 | 5/2013 |

(Continued)

OTHER PUBLICATIONS

European Search Report in European Application No. 16861478.2, dated Oct. 30, 2018, 16 pages.
(Continued)

*Primary Examiner* — Ghazal B Shehni
(74) *Attorney, Agent, or Firm* — Fish & Richardson P.C.

(57) ABSTRACT

Target application information for validation is received at a network device from user equipment. The received target application information is validated. Risk information associated with the validated target application information is determined. Based on the determined risk information, prompt information is returned to the user equipment.

12 Claims, 5 Drawing Sheets

(51) Int. Cl.
*G06F 16/951* (2019.01)
*G06F 16/23* (2019.01)
*H04W 12/12* (2009.01)
*H04W 4/12* (2009.01)
*G06F 21/57* (2013.01)
*G06F 21/53* (2013.01)
*H04W 4/14* (2009.01)

(56) References Cited

U.S. PATENT DOCUMENTS

| | | | |
|---|---|---|---|
| 2008/0189770 A1 | 8/2008 | Sachtjen | |
| 2012/0151578 A1 | 6/2012 | Niemelä | |
| 2013/0019281 A1* | 1/2013 | Jacobs | G06F 21/575 726/4 |
| 2014/0308920 A1 | 10/2014 | Bendi et al. | |
| 2015/0007312 A1 | 1/2015 | Pidathala et al. | |

FOREIGN PATENT DOCUMENTS

| | | |
|---|---|---|
| CN | 104023320 | 9/2014 |
| CN | 104378345 | 2/2015 |
| CN | 104539624 | 4/2015 |
| JP | 2009289001 | 12/2009 |
| JP | 2010086538 | 4/2010 |
| JP | 2010198054 | 9/2010 |
| JP | 2013540303 | 10/2013 |
| JP | 2014513834 | 6/2014 |
| JP | 2015103078 | 6/2015 |
| KR | 20110128632 | 11/2011 |
| KR | 101507404 | 4/2015 |
| KR | 20150062644 | 4/2015 |
| WO | WO 2014056538 | 4/2014 |
| WO | WO 2014148854 | 9/2014 |
| WO | WO2015105222 | 7/2015 |

OTHER PUBLICATIONS

Search Report and Written Opinion of the Intellectual Property Office of Singapore issued in Singapore Application No. 11201803771T dated Jul. 30, 2018; 10 pages.
International Search Report issued by the International Searching Authority in International Application No. PCT/CN2016/103489 dated Dec. 30, 2016; 10 pages.
European Extended Search Report in European Application No. 16861478.2, dated Mar. 14, 2019, 15 pages.
Crosby et al., "BlockChain Technology: Beyond Bitcoin," Sutardja Center for Entrepreneurship & Technology Technical Report, Oct. 16, 2015, 35 pages.
International Preliminary Report on Patentability in International Application No. PCT/CN2016/103489, dated May 8, 2018, 13 pages (with English Translation).
Nakamoto, "Bitcoin: A Peer-to-Peer Electronic Cash System," www.bitcoin.org, 2005, 9 pages.
Written Opinion in International Application No. PCT/CN2016/103489, dated Dec. 30, 2016, 9 pages (with English Translation).

* cited by examiner

METHOD AND DEVICE FOR APPLICATION INFORMATION RISK MANAGEMENT

This application is a continuation of PCT Application No. PCT/CN2016/103489, filed on Oct. 27, 2016, which claims priority to Chinese Patent Application No. 201510746296.6, filed on Nov. 5, 2015, and each application is hereby incorporated by reference in its entirety.

TECHNICAL FIELD

The present application relates to the computer field, and in particular, to an application information risk management technology.

BACKGROUND

To process risky application information, such as a suspected SMS phishing (Smishing) message, corresponding security software usually needs to be installed on a mobile phone of a user. The user can use the security software to upload all SMS messages in the mobile phone of the user to the cloud, and then the cloud can perform screening analysis on all the SMS messages one-by-one. During this process, both a volume of transmitted data and a volume of validation data are relatively large, a risk of leakage of private user information is relatively high, and a user's participation level in user privacy information management is low. Consequently, the user experience is poor.

SUMMARY

When SMS messages in user equipment are uploaded to a network device, SMS message management efficiency is low, and a risk of leakage of private user information is relatively high. The present application aims to provide a method and device for application information risk management and to resolve such problems.

Based on an aspect of the present application, a method for application information risk management on a network device side is provided, including: acquiring target application information that a user selects and requests for validation by using user equipment; validating the target application information to obtain corresponding risk information; and returning corresponding prompt information to the user equipment based on the risk information.

Based on another aspect of the present application, a method for application information risk management on a user equipment side is provided, including: acquiring target application information that a user selects and requests for validation by using user equipment; sending the target application information to a corresponding network device; and acquiring prompt information that is returned by the network device and that is based on risk information of the target application information.

Based on another aspect of the present application, a network device for application information risk management is further provided, including: a target application information acquiring apparatus, configured to acquire target application information that a user selects and requests for validation by using user equipment; a target application information validation apparatus, configured to validate the target application information to obtain corresponding risk information; and a prompt information sending apparatus, configured to return corresponding prompt information to the user equipment based on the risk information.

Based on still another aspect of the present application, a user equipment for application information risk management is further provided, including: a user-selected target application information acquiring apparatus, configured to acquire target application information that a user selects and requests for validation by using user equipment; a target application information sending apparatus, configured to send the target application information to a corresponding network device; and a prompt information receiving apparatus, configured to acquire prompt information that is returned by the network device and that is based on risk information of the target application information.

Based on another aspect of the present application, a system for application information risk management is further provided. The system includes the network device for application information risk management based on the another aspect of the present application, and the user equipment for application information risk management based on the still another aspect of the present application.

In comparison, in the present application, the target application information that the user selects and requests for validation is validated by using the network device, and the prompt information corresponding to the risk information obtained through validation is returned to the corresponding user equipment. Here, the user can directly select one or more pieces of target application information from a corresponding application information interface of the user equipment without the need to jump to a third-party application operation. In addition, the user can autonomously determine some or all to-be-uploaded target application information. Therefore, a user's participation level in user privacy information management is improved, and the probability of leakage of the user's private information is reduced. Also, with a flexible selection, a volume of data transmitted between the devices can be reduced, so that a volume of validation data that the network device processes is accordingly reduced, and overall application information risk management efficiency is improved.

Further, the network device performs match querying in the corresponding validation database based on the related attribute information of the target application information. For target application information that does not match the corresponding record information, the network device can further simulate execution of the corresponding user guide information to determine the corresponding risk information. Therefore, risk information determining accuracy is ensured through a multi-level determining manner. As such, the user can perform effective processing based on the prompt information corresponding to high-accuracy risk information.

Further, when the risk information is that the SMS message is false information, the network device sends rogue base station prompt information to nearby user equipment of the user equipment. When the false information corresponds to a rogue base station, a warning can be sent to other user equipment that is in the coverage area of the rogue base station and that can receive the Smishing message to reduce and prevent more risks caused by the false information sent by the rogue base station.

Further, the user equipment sends the target application information selected by the user to the corresponding network device for validation, and receives the prompt information that is returned by the network device and that is based on the risk information of the target application information. As such, the user equipment cooperates with the network device to implement risk management on the application information.

Further, in a preferred embodiment, the user equipment can further perform a risk pre-analysis on the received application information, to guide the user to select target application information, thereby helping the user to efficiently identify some application information with a higher risk and improving the user experience.

BRIEF DESCRIPTION OF DRAWINGS

Other features, objectives, and advantages of the present application become more apparent by reading a detailed description of the non-limitative embodiments with reference to the following accompanying drawings.

Same or similar reference numbers in the accompanying drawings represent same or similar components.

DESCRIPTION OF EMBODIMENTS

The following describes the embodiments of the present application in detail with reference to accompanying drawings.

In a typical configuration of the present application, a terminal, a serving network device, and a credible party each include one or more central processing units (CPU), an input/output interface, a network interface, and a memory.

The memory can include a non-persistent memory, a random access memory (RAM), a non-volatile memory, etc. in a computer-readable medium, for example, a read-only memory (ROM) or a flash memory (flash RAM). The memory is an example of the computer-readable medium.

The computer-readable medium includes persistent, non-persistent, movable, and unmovable media that can implement information storage by using any method or technology. Information can be a computer-readable instruction, a data structure, a program module, or other data. A computer storage medium includes, but is not limited to, a phase-change memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on a definition in this specification, the computer-readable medium does not include a non-transitory computer-readable storage medium, such as a modulated digital signal and a carrier.

Figure 1:
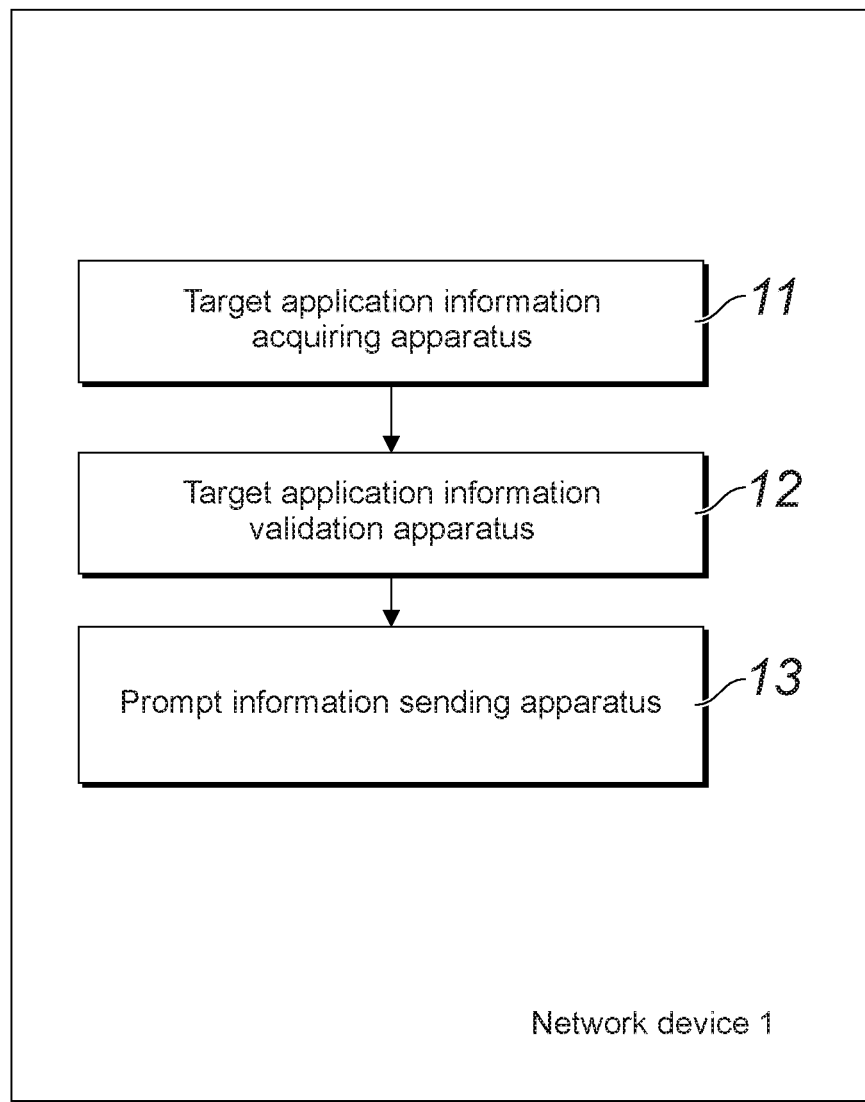
FIG. 1 shows a schematic diagram of a network device for application information risk management based on an aspect of the present application.

FIG. 1 shows a schematic diagram of a network device 1 for application information risk management based on an aspect of the present application.

The network device 1 includes a target application information acquiring apparatus 11, a target application information validation apparatus 12, and a prompt information sending apparatus 13. The target application information acquiring apparatus 11 acquires target application information that a user selects and requests for validation by using user equipment 2. The target application information validation apparatus 12 validates the target application information to obtain corresponding risk information. The prompt information sending apparatus 13 returns corresponding prompt information to the user equipment based on the risk information.

Figure 2:
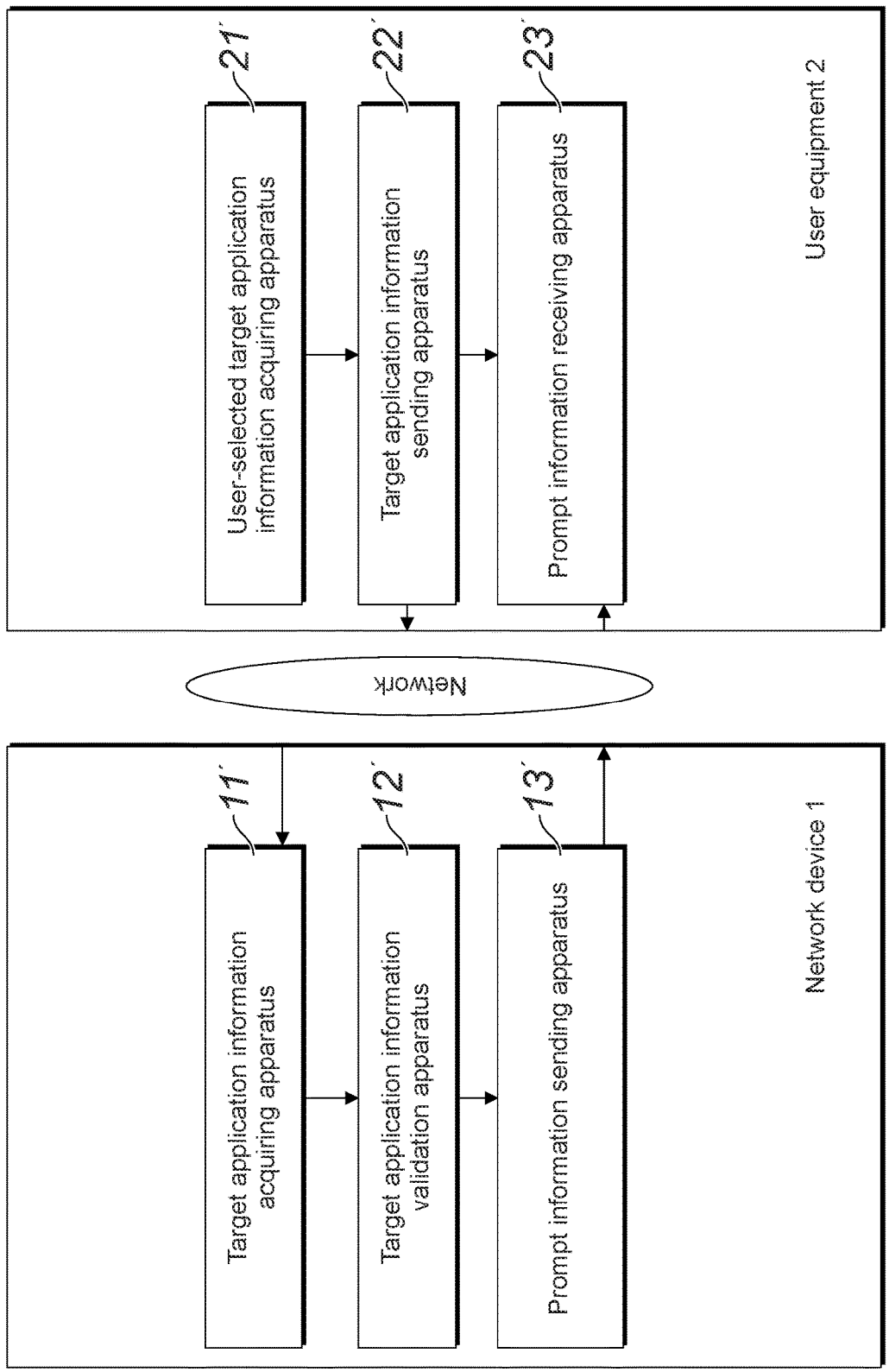
FIG. 2 shows a schematic diagram of a system of a network device and user equipment for application information risk management based on a preferred embodiment of the present application.

Specifically, the target application information acquiring apparatus 11 acquires the target application information that the user selects and requests for validation by using the user equipment 2 (referring to FIG. 2). Here, the network device 1 includes various intelligent terminals, such as various cloud servers or server clusters. The user equipment 2 includes various intelligent terminal devices, such as various personal computers and smartphones. Here, the application information includes, but is not limited to, an SMS message, a WeChat message, an e-mail, or other information transferred based on a specific application program in the user equipment 2. Here, the target application information acquired by the network device 1 comes from the corresponding user equipment 2. Preferably, the target application information is autonomously selected by the user from application information in a target application of the user equipment 2. For example, the user can copy the target application information to a text box, and select to submit the target application information. Then, the user equipment 2 sends the target application information to the corresponding network device 1. As another example, the user can directly select and submit the target application information in an application. Here, preferably, the network device 1 acquires the target application information sent by the user equipment 2 in an encrypted transmission manner. For example, the target application information is an SMS message. When the user enters an SMS application interface of the user equipment 2, such as a mobile phone, the user directly selects a suspected Smishing message from various displayed SMS messages, and determines one or more pieces of target application information on which risk validation is to be performed. Then, the target application information acquiring apparatus 11 of the network device 1 acquires the target application information selected by the user and a corresponding validation request.

Here, the target application information acquired by the target application information acquiring apparatus 11 can be in an original form of the target application information acquired by the user equipment 2. For example, if the target application information is an SMS message, the target application information acquired by the network device 1 can be in the form of an SMS message text displayed on the SMS application interface of the user equipment 2. In addition, the user equipment 2 can first analyze original application information received by the user equipment 2 or extract information from the original application information. For example, the user equipment 2 extracts a keyword from an SMS message based on a category and sends the extracted keyword to the network device 1. As such, target application information to be validated can be preliminarily analyzed and sorted out, and a volume of data transmitted between devices is reduced.

In addition, when acquiring the target application information, the network device 1 can correspondingly acquire related attribute information of the target application information, such as sender information of the target application information or user guide information of the target application information.

Afterwards, the target application information validation apparatus 12 validates the target application information to obtain the corresponding risk information. Here, in the present application, the network device 1 performs a risk validation analysis on the target application information by using the network device 1. Here, a risk of the target application information can include a direct risk imposed on user privacy security and user equipment security, and can further include a potential risk imposed on the user by junk application information, such as a false advertisement. For validating the target application information, the target application information and the related attribute information can be comprehensively considered or evaluated by means of classification. Here, specific validation methods can be flexibly selected and combined based on actual needs. For example, the target application information can be validated and analyzed based on a pre-existing validation database. As another example, simulation execution can be performed on the user guide information of the target application information in a sandbox environment to identify whether the target application information includes risk information. For instance, security of the target application information can be validated for a plurality of times by combining a plurality of validation methods. For example, the target application information is validated by separately using the methods described in the two previous examples to improve the accuracy of the finally obtained risk information. Here, the risk information can include determining information that there is a risk or determining information that there is no risk. Further, preferably, the determining information that there is a risk can be specifically classified and graded based on the content of the risk and the adverse consequence caused by the risk. For example, if the target application information includes content such as a phishing website, a Trojan horse, or a rogue base station and the like, a risk value of the target application information is set to 99%, or the target application information is defined to be at a high-risk level.

Afterwards, the prompt information sending apparatus 13 returns, based on the risk information, the corresponding prompt information to the user equipment 2. Here, preferably, the network device 1 generates the corresponding prompt information based on the risk information obtained through validation, and returns the prompt information to the user equipment 2. For example, when the risk information is the determining information that there is a risk, such as when the risk information is that a target SMS message is false information, the corresponding risk warning information is generated. The content of the risk warning information can include a highlighting of an SMS message with a risk warning in the user equipment 2, a specific prompt SMS message, or prompt information in another form, or even a direct process of the SMS message as a junk SMS message by the user equipment 2, etc. As another example, when the risk information is the determining information that there is no risk, the corresponding validation security information can be sent to the user equipment 2.

In the present application, the target application information that the user selects and requests for validation is validated by using the network device 1, and the prompt information corresponding to the risk information obtained through validation is returned to the corresponding user equipment 2. Here, the user can directly select one or more pieces of target application information from a corresponding application information interface of the user equipment without the need to jump to a third-party application operation. In addition, the user can autonomously determine some or all to-be-uploaded target application information. Therefore, a user's participation level in user privacy information management is improved, and the probability of leakage of the user's private information is reduced. Also, with a flexible selection, a volume of data transmitted between the devices can be reduced, so that a volume of validation data that the network device processes is accordingly reduced, and overall application information risk management efficiency is improved.

In a preferred embodiment, the target application information validation apparatus 12 includes a match query unit (not shown) and a first risk information determining unit (not shown). The match query unit performs match querying in a corresponding validation database based on the related attribute information of the target application information. The first risk information determining unit determines the corresponding risk information based on record information that is in the validation database and that matches the related attribute information.

Specifically, the match query unit performs match querying in the corresponding validation database based on the related attribute information of the target application information. Here, the validation database is preferably an SMS message template library, a phishing website library, a Trojan virus library, etc. The SMS message template library includes an SMS message that is determined as a template, and that is collected by the network device 1 and is of a high historical risk factor, such as a determined Smishing message, or a derived SMS message template with relatively high similarity inferred based on a pre-known Smishing message. The phishing website library, the Trojan virus library, etc., include information about a website that is collected by the network device 1 and that is determined as a phishing website, or information about a file determined to include a Trojan virus. The information in the previous phishing website library and the Trojan virus library can be directly extracted from the application information in each user equipment 2, or can be existing data from another database, or a third-party device. Here, the related attribute information includes any information that is associated with the target application information, for example, sender information of the target application information, the content information of the target application information, user guide information of the target application information, etc. Here, based on the types of the different validation databases, corresponding match querying can be performed on appropriate information selected from the related attribute information of the target application information. For example, when the validation database is a phishing website library, the user guide information of the target application information can be selected. For example, a target SMS message includes information about a website, and math querying is performed on the information. As another example, if the validation database is the SMS message template library, the content of the target application information is selected, and match querying is performed on the content. Here, preferably, when a plurality of validation database types are preconfigured on the network device 1, one or more validation databases can be selected and used as a reference database based on needs, for example, based on a user's selection, or based on an intelligent decision of a type of the target application information. In addition, preferably, each validation database can be graded based on the risk level corresponding to the application information, and a validation database at a specific grade is selected for the target application information based on the grade, or validation databases at a plurality of grades are selected for successively validating the target application information.

Here, a person skilled in the art should understand that the SMS message template library, the phishing website library, and the Trojan virus library are only examples, and an existing database or a future database that can be used for target application information validation and is applicable to the solution shall fall within the protection scope of the present application, and is incorporated here by reference.

Afterwards, the first risk information determining unit determines the corresponding risk information based on the record information that is in the validation database and that matches the related attribute information. Here, if the record information that matches the related attribute information is identified in the corresponding validation database, for example, if a target SMS message includes information about a website, and its corresponding record in the phishing website library is a phishing website. As another example, if the above-mentioned text content of the target SMS message is consistent with the content of a Smishing message template in the SMS message template library, the risk information corresponding to the target application information can be determined, for example, as the determining information that there is a risk, or further, the risk information includes corresponding risk level information.

In addition, when the validation database does not include the record information that matches the related attribute information, the target application information can be inferred to be security information with a relatively low risk based on needs, and corresponding validation security information is returned to the user equipment 2. Alternatively, another validation database or even another validation method is selected for risk validation, and corresponding risk information is provided. For example, when no corresponding record information can be matched by using the SMS message template library, match queries are further performed based on the phishing website library. As another example, when no corresponding record information can be matched in all or some predetermined validation databases, matching can be performed in another validation method, for example, matching with an SMS message/phone number library of a financial institution. For example, simulation execution can be performed on the user guide information of the target application information in a sandbox environment to identify whether the target application information includes risk information.

Preferably, the related attribute information includes at least one of the following: sender information of the target application information, content information of the target application information, or user guide information of the target application information.

Here, specifically and preferably, when acquiring the target application information, the network device 1 acquires the corresponding related attribute information at the same time. The related attribute information includes the sender information of the target application information, for example, a device number of a sender of an SMS message, a cell phone number, or an institution-specific number, or e-mail address information of a sender of an e-mail. The related attribute information further includes the content of the target application information, for example, text content of an SMS message or body content of an e-mail, and the like. The related attribute information further includes the user guide information. The user guide information includes any information instructing a user to perform a related operation. For example, a website hyperlink provided to the user or download address information provided to the user, and the like. Here, different validation and analysis operations are performed based on different specific contents of the related attribute information, for example, different validation databases are selected for different related attribute information to perform match querying.

Here, a person skilled in the art should understand that the sender information of the target application information, the content information of the target application information, or the user guide information of the target application information are only examples, and related attribute information of other existing or future target application information that is applicable to the solution shall fall within the protection scope of the present application, and is incorporated here by reference.

In a preferred embodiment (referring to FIG. 1), the related attribute information includes the user guide information of the target application information. The target application information validation apparatus 12 further includes a second risk information determining unit (not shown). When no record information that matches the user guide information is identified in the validation database, the second risk information determining unit simulates execution of the target application information based on the user guide information to obtain the corresponding risk information.

Specifically, in this embodiment, when the related attribute information includes the user guide information of the target application information, if no record information that matches the user guide information is identified in the validation database, preferably, specific simulation execution is performed on the user guide information. Here, considering that a simulation execution process can have a security risk, the network device 1 can be disposed in a sandbox environment to perform a simulation experiment. For example, when the user guide information is a download link or website information, the network device 1 extracts the user guide information, and runs a browser or another corresponding program in a preconfigured sandbox environment to open the foregoing web site URL information or the downlink link to perform the operation indicated by the user guide information. Further, the security problem in an execution operation process is analyzed, or the execution result of the simulation execution is further determined and analyzed to obtain the corresponding risk information. For example, if a website link corresponding to the user guide information is opened through simulation execution, and the result corresponds to a phishing website, it can be inferred that the target application information is risky, and the corresponding risk information is determined. Here, changes caused by an operation executed in the sandbox environment are subsequently deleted. In addition, possible risks that can be brought by executing a program in the virtual execution environment cause no actual damage to related devices such as the network device 1.

In addition, based on a risk source, for example, phishing website information, a Trojan virus, or a security risk of an SMS message text, risk information extraction and classification can be performed on relatively high-risk target application information determined through the simulation execution, so as to update information about the corresponding validation database, and feedback the risk information to different financial institutions based on risk types.

In this embodiment, the network device 1 performs match querying in the corresponding validation database based on the related attribute information of the target application information. For target application information that does not match the corresponding record information, the network device 1 can further simulate execution of the corresponding user guide information to determine the corresponding risk information. Therefore, risk information determining accuracy is ensured through a multi-level determining manner. As such, the user can perform effective processing based on the prompt information corresponding to high-accuracy risk information.

Preferably, when no record information that matches the user guide information is identified in the validation database, the second risk information determining unit simulates acquiring, based on the user guide information, target information that is in the target application information and that the user is guided to acquire; and validates the correspondence between the target information and the target application information to obtain the corresponding risk information.

Specifically and preferably, the target information that is in the target application information and is acquired by a guided user is first obtained by means of simulation based on the guided user information. Here, the target information includes a corresponding result that the network device 1 points to by executing the guide user information through simulation. For example, the target information can be a webpage that the user is guided to open, or can be a file that the user is guided to download. Then, the network device 1 validates the correspondence between the target information and the target application information to obtain the corresponding risk information. Here, the risks brought by the target information include a direct risk imposed on user privacy security and user equipment security, for example, a downloaded file includes a virus. The risks brought by the target information also include a potential risk brought by some spam information, for example, when an opened website is a false advertisement website, some damage can be caused if the user performs a corresponding operation based on instruction information on the website. Here, the correspondence between the target information and the target application information is determined in order to determine the relevance of the target information and the target application information. Generally speaking, there exists high-risk target application information such as a false SMS message with the purpose to deceive the user into performing an operation against his will or unintentionally performing an unfavorable operation. Therefore, there is a relatively high possibility that the target information corresponding to such target application information is inconsistent with or does not match the target application information. This is an important basis for validating the correspondence in the present application. The correspondence validation between the target information and the target application information can include checking whether sender information of the target information is consistent with the sender information of the target application information; checking whether content of the target information is associated with the content of the target application information; or checking whether sandbox operation information of the target information matches the target application information.

Here, a person skilled in the art should understand that the previous methods for validating the correspondence between the target information and the target application information are only examples, and an existing or a future method that is for validating the correspondence between the target information and the target application information and that is applicable to the solution shall fall within the protection scope of the present application, and is incorporated here by reference.

More preferably, the correspondence validation between the target information and the target application information includes at least one of the following: checking whether sender information of the target information is consistent with the sender information of the target application information; checking whether content of the target information is associated with the content of the target application information; or checking whether sandbox operation information of the target information matches the target application information.

Specifically, the correspondence validation between the target information and the target application information includes checking whether the sender information of the target information is consistent with the sender information of the target application information. If the sender information of the target information is consistent with the sender information of the target application information, it can be inferred that the target information matches the target application information. Therefore, it can be inferred from the validation that the target application information has high security and low risk. Otherwise, it is inferred that the target information does not match the target application information. It can be inferred from the validation that the target application information has a low security and a high risk. Here, for example, the target application information is an SMS message. If a sender of the SMS message is a number of a mobile operator, the content of the SMS message is about providing free calls, and user guide information is a webpage link of the operator, and if the acquired target information is a related webpage of the mobile operation indeed, it is considered that the sender of the target information is consistent with the sender of the SMS message, and it can be inferred that the target information matches the target application information. On the contrary, if an irrelevant webpage is opened after clicking the link, it can be inferred that the target information does not match the target application information. Here, preferably, if the sender information is inconsistent, it can be further determined whether the sender of the target application information is a rogue base station that dedicatedly sends false information. If so, it can be inferred that the application information sent by the sender is false information. In addition, the network device 1 can further record information about the rogue base station, and warn the related user equipment 2.

Here, the correspondence validation between the target information and the target application information further includes checking whether the content of the target information is associated with the content of the target application information. Here, if the content of the target information matches the content of the target application information, it is considered that the correspondence between the target information and the target application information is relatively high, and it is inferred that the security of target application information is relatively high, and the risk is low. On the contrary, it is inferred that the target application information is less secure and has a higher risk. Here, for example, the target application information is an SMS message. If the content of the SMS message is a link about shopping mall discount information, but an irrelevant payment website is opened after clicking the link, it is inferred that the content of the target information is unrelated to the content of the target application information, and the target information can be potentially dangerous.

Here, the correspondence validation between the target information and the target application information further includes checking whether the sandbox operation information of the target information matches the target application information. Here, if the sandbox operation information of the target information matches the target application information, the target application information is relatively secure with a lower risk. On the contrary, if the sandbox operation information of the target information does not match the target application information, it can be inferred that the target application information has low security and high risk. Here, for example, the target application information is an SMS message. When the target information is a downloaded application corresponding to a download link in the SMS message, if the downloaded application is installed or run in the sandbox, and if a specific operation step is different from what described in the target application information, or a result obtained by executing the application is different from what described in the target application information, it can be inferred that the sandbox operation information of the target information does not match the target application information, and there is a high security risk.

Here, a person skilled in the art should understand that the previous methods for validating the correspondence between the target information and the target application information are only examples, and an existing or a future method that is for validating the correspondence between the target information and the target application information and that is applicable to the solution shall fall within the protection scope of the present application, and is incorporated here by reference.

In a preferred embodiment (referring to FIG. 1), the target application information includes an SMS message, and the network device 1 further includes a rogue base station prompt information sending apparatus (not shown). The rogue base station prompt information sending apparatus sends rogue base station prompt information to nearby user equipment of the user equipment when the risk information is that the SMS message is false information. A distance between the nearby user equipment and the user equipment is less than or equal to a predetermined device distance threshold.

Specifically, here, the rogue base station is a pseudo base station, and usually comprises a host and a laptop. The rogue base station can be configured to search for the information about a subscriber identity module (SIM) card in an area within a certain radius of the base station by using a device such as an SMS message blasts device, an SMS message sender, or the like. The rogue base station forcibly sends an SMS message such as a Smishing message or an advertisement SMS message to the user's mobile phone by disguising itself as a base station of a carrier and fraudulently using a cell phone number of another user. In this embodiment, the target application information includes SMS message information. If the risk information of the target application information obtained through the validation by the network device 1 includes the SMS message being false information, and it can be further inferred that the false information is sent by a corresponding rogue base station, the location information of the rogue base station can be determined, or a movement track of the rogue base station can be determined to infer the location information of the rogue base station. In addition, the rogue base station prompt information sending apparatus sends the rogue base station prompt information to the nearby user equipment of the user equipment, wherein the distance between the nearby user equipment and the user equipment is less than or equal to a predetermined device distance threshold information. The nearby user equipment includes various mobile intelligent terminal devices, and preferably, includes a device with a mobile communication function, for example, a terminal device that can receive an SMS message, such as a mobile phone, or a tablet computer with an SMS message receiving/sending function. Here, the predetermined device distance threshold can be set based on the location information of the rogue base station and the coverage of sending the SMS message. Here, the rogue base station prompt information can be sent to the nearby user equipment when the network device 1 first acquires and determines the information about the rogue base station. Alternatively, each time when the SMS message is determined as false information, the rogue base station prompt information can be sent to the nearby user equipment at the same time. Here, if a corresponding positioning function is enabled on the nearby user equipment, for example, a GPS (Global Positioning System, global positioning system) function of a mobile phone is enabled, the network device 1 can search for and obtain corresponding latitude and longitude information of the mobile phone. In this case, if the distance between the nearby user equipment and the user equipment is less than or equal to the predetermined device distance threshold, the rogue base station prompt information is sent to the nearby user equipment.

In this embodiment, when the risk information includes the SMS message information being false information, the network device 1 sends the rogue base station prompt information to the nearby user equipment of the user equipment 2. When the false information corresponds to a rogue base station, a warning can be sent to other user equipment that is in the coverage area of the rogue base station and that can receive the Smishing message to reduce and prevent more risks caused by the false information sent by the rogue base station. Specifically, when other user equipment use a target application, the network device 1 can send information about a rogue base station exists near the network device 1, and the network device 1 can directly push a warning with permission of other user equipment.

FIG. 2 shows a schematic diagram of a system of a network device 1 and user equipment 2 for application information risk management based on a preferred embodiment of the present application.

The network device 1 includes a target application information acquiring apparatus 11', a target application information validation apparatus 12', and a prompt information sending apparatus 13'. The user equipment 2 includes a user-selected target application information acquiring apparatus 21', a target application information sending apparatus 22', and a prompt information receiving apparatus 23'. The target application information acquiring apparatus 11' acquires target application information that a user selects and requests for validation by using the user equipment 2. The target application information validation apparatus 12' validates the target application information to obtain corresponding risk information. The prompt information sending apparatus 13' returns corresponding prompt information to the user equipment 2 based on the risk information. The user-selected target application information acquiring apparatus 21' acquires the target application information that the user selects and requests for validation by using the user equipment 2. The target application information sending apparatus 22' sends the target application information to the corresponding network device 1. The prompt information receiving apparatus 23' acquires the prompt information that is returned by the network device 1 and that is based on the risk information of the target application information. Here, the target application information acquiring apparatus 11', the target application information validation apparatus 12', and the prompt information sending apparatus 13' are basically the same as the target application information acquiring apparatus 11, the target application information validation apparatus 12, and the prompt information sending apparatus 13 shown in FIG. 1. Details are not described here again, and are incorporated here by reference.

Specifically, here, the user-selected target application information acquiring apparatus 21' acquires the target application information that the user selects and requests for validation by using the user equipment 2. Here, preferably, the target application information is directly determined based on an autonomous selection operation of the user. Here, application information such as an SMS message, a WeChat message, or an e-mail includes massive user privacy information. Therefore, if all the information is uploaded by a third-party application, a risk of information leakage is increased. Therefore, in the present application, preferably, the user can autonomously select one or more pieces of target application information that actually needs to be sent to the network device for validation. Here, further, preferably, the user can directly perform a selection operation on an operating interface of a target application corresponding to the target application information in the user equipment 2. For example, if the target application information is an SMS message, the user can directly select a suspected Smishing message when entering the SMS application, so that the need to jump to another third-party application interface is avoided. Here, a response operation for an instruction of the user for selection and validation request can be implemented by executing an independent application program loaded to the network device 1, or by running a corresponding plug-in that matches the target application such as the SMS application.

Afterwards, the target application information sending apparatus 22' sends the target application information to the corresponding network device 1. Here, the target application information sent to the network device 1 can be in an original form of the target application information acquired by the user equipment 2. For example, if the target application information is an SMS message, the target application information acquired by the network device 1 can be in the form of an SMS message text displayed on the SMS application interface of the user equipment 2. In addition, the user equipment 2 can first analyze original application information received by the user equipment 2 or extract information from the original application information. For example, the user equipment 2 extracts a keyword from an SMS message based on a category and sends the extracted keyword to the network device 1. As such, the user equipment 2 can first preliminarily analyze and sort out target application information to be validated, and reduce a volume of data transmitted between devices. In addition, when sending the target application information, the user equipment 2 can further send, to the network device 1, related attribute information corresponding to the target application information, such as sender information of the target application information or user guide information of the target application information, so as to subsequently perform risk validation operations on the target application information in the network device 1 in a plurality of manners. Here, preferably, the user equipment 2 sends the target application information to the network device 1 in an encrypted transmission manner.

Accordingly, the target application information acquiring apparatus 11' of the network device 1 acquires the target application information that the user selects and requests for validation by using the user equipment 2. Then, the target application information validation apparatus 12' of the network device 1 validates the target application information to obtain the corresponding risk information.

Afterwards, the prompt information sending apparatus 13' of the network device 1 returns the corresponding prompt information to the user equipment 2 based on the risk information. Accordingly, the prompt information receiving apparatus 23' of the user equipment 2 acquires the prompt information that is returned by the network device 1 and that is based on the risk information of the target application information. Here, preferably, the prompt information received by the user equipment 2 is corresponding prompt information generated by the network device 1 based on the risk information obtained through validation. For example, when the risk information is determining information that there is a risk, such as when the risk information is that a target SMS message is false information, the corresponding risk warning information is generated. The content of the risk warning information can include a highlighting of an SMS message with a risk warning in the user equipment 2, a specific prompt SMS message, or prompt information in another form, or even a direct process of the SMS message as a junk SMS message by the user equipment 2, etc. As another example, when the network device 1 determines that the risk information is determining information that there is no risk, the user equipment 2 acquires corresponding validation security information. Further, here, preferably, the user can choose to adopt the prompt information sent by the network device 1 to perform subsequent processing on the application information such as an SMS message of the user, or choose not to adopt the prompt information and retain the target application information. As such, a user's right for processing privacy-related information of the user is fully respected. In addition, prompt information content can be automatically executed based on predetermined settings made by the user when the corresponding prompt information is obtained. For example, the user can perform pre-selecting. As such, after the network device 1 performs risk validation, if a risk of the target application information is relatively high and reaches a predetermined level, the target application information is automatically deleted. Therefore, after the user equipment 2 receives prompt information that meets a condition, a corresponding instruction operation can be automatically performed, and the user does not need to be inquired. To sum up, the automatic operation does not go against the user's will, but also the result of user participation in the operation.

Here, the user equipment 2 sends the target application information selected by the user to the corresponding network device 1 for validation, and receives the prompt information that is returned by the network device 1 and that is based on the risk information of the target application information. As such, the user equipment cooperates with the network device 1 to implement risk management on the application information.

Preferably, the user equipment 2 further includes a risk pre-analysis apparatus (not shown) and an application information display apparatus (not shown). The risk pre-analysis apparatus performs a risk pre-analysis on the application information received by the user equipment 2. The application information display apparatus displays, in a corresponding application, one or more pieces of application information that are at risk acquired through the risk pre-analysis. The user-selected target application information acquiring apparatus 21' acquires the target application information that the user selects from the one or more pieces of application information and requests for validation by using the user equipment 2.

Specifically, target application information with a relatively high risk such as a false SMS message usually cannot be easily recognized. Therefore, in order to facilitate the autonomous selection of the target application information by the user, improve the probability that the target application information autonomously selected by the user is determined as high-risk application information, and improve the efficiency of performing target application information risk validation by the network device 1 subsequently, preferably, the risk pre-analysis apparatus can be configured to perform the risk pre-analysis on the application information received by the user equipment 2, and then a corresponding prompt assistance is provided to the user based on the result of the risk pre-analysis. Here, the user equipment 2 can acquire and store in advance some related information about application information that is recently collected and that is with a relatively high risk. For example, a recent collection database of Smishing message sender numbers is pre-acquired, and then based on information of the database, a risk pre-analysis is performed on an SMS message received by the user equipment 2. Here, data information that is used as pre-analysis reference data can be from the corresponding network device 1, for example, from a collection of related information about recent validation database information corresponding to the network device 1, for example, validation database information within one month. As another example, a list of recent risky data in a current region can be cached in the user equipment 2, and then the application information acquired by the user equipment 2 is compared with the data list. Here, a preliminary evaluation analysis of the application information can be performed without increasing an operation burden of the user equipment 2, so as to effectively prompt the user.

Afterwards, the application information display apparatus displays, in a corresponding application, one or more pieces of application information that are at risk acquired through the risk pre-analysis. Here, the result of the risk pre-analysis can be effectively displayed on a target application interface, for example, shown in a highlighted manner. For example, the application information that is at risk can be displayed in a manner including but not limited to different colors or fonts, or specific prompting markers. As another example, the user is prompted by a prompt window. Afterwards, the user-selected target application information acquiring apparatus 21' acquires the target application information that the user selects from the one or more pieces of application information and requests for validation by using the user equipment 2. Here, the result of the risk pre-analysis is an operation prompt for the user. However, in practice, the user can select, based on the user's will, one or more of the prompted application information of the indicated risk, or select no application information.

In this embodiment, the user equipment 2 can further perform a risk pre-analysis on the received application information, to guide the user to select target application information, thereby helping the user to efficiently identify some application information with higher risk to improve user experience.

Figure 3:
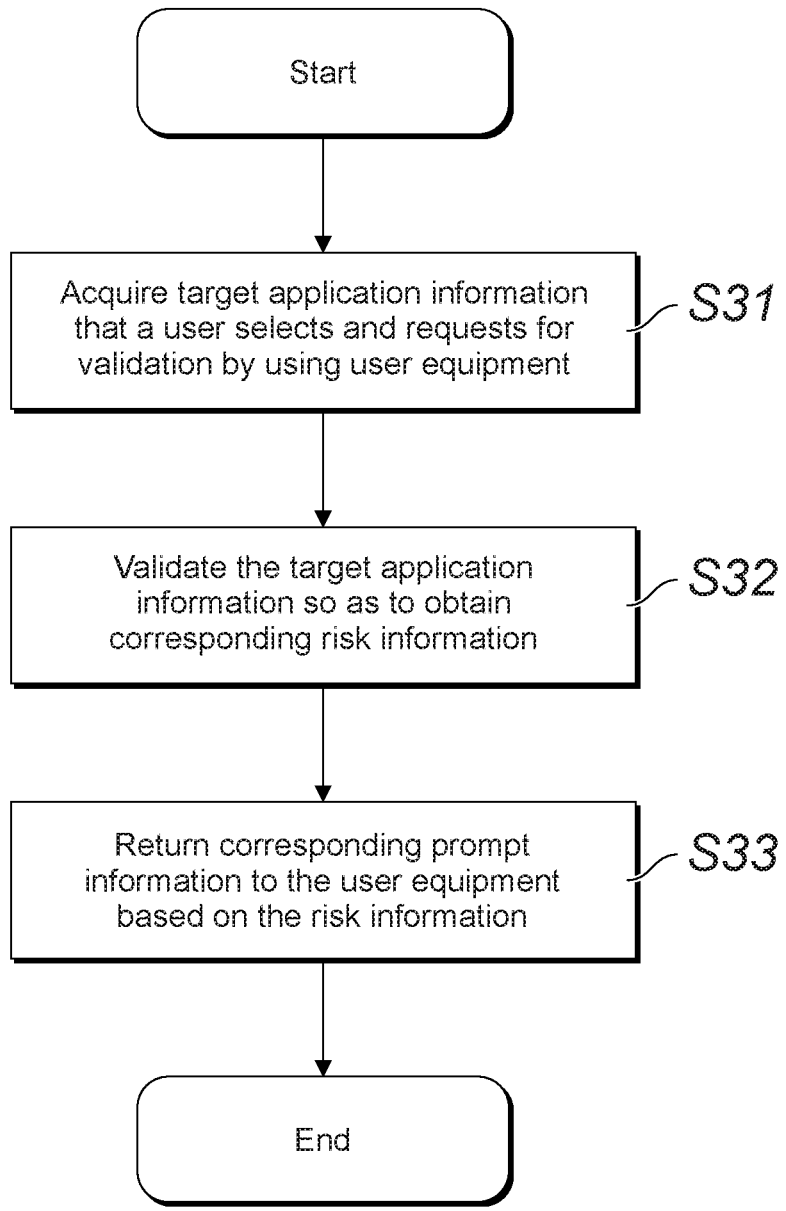
FIG. 3 shows a flowchart of a method for application information risk management on a network device side based on another aspect of the present application.

FIG. 3 shows a flowchart of a method for application information risk management on a network device side based on another aspect of the present application.

The method includes steps S31, S32, and S33. In step S31, a network device 1 acquires target application information that a user selects and requests for validation by using user equipment 2. In step S32, the network device 1 validates the target application information to obtain corresponding risk information. In step S33, the network device 1 returns corresponding prompt information to the user equipment based on the risk information.

Figure 4:
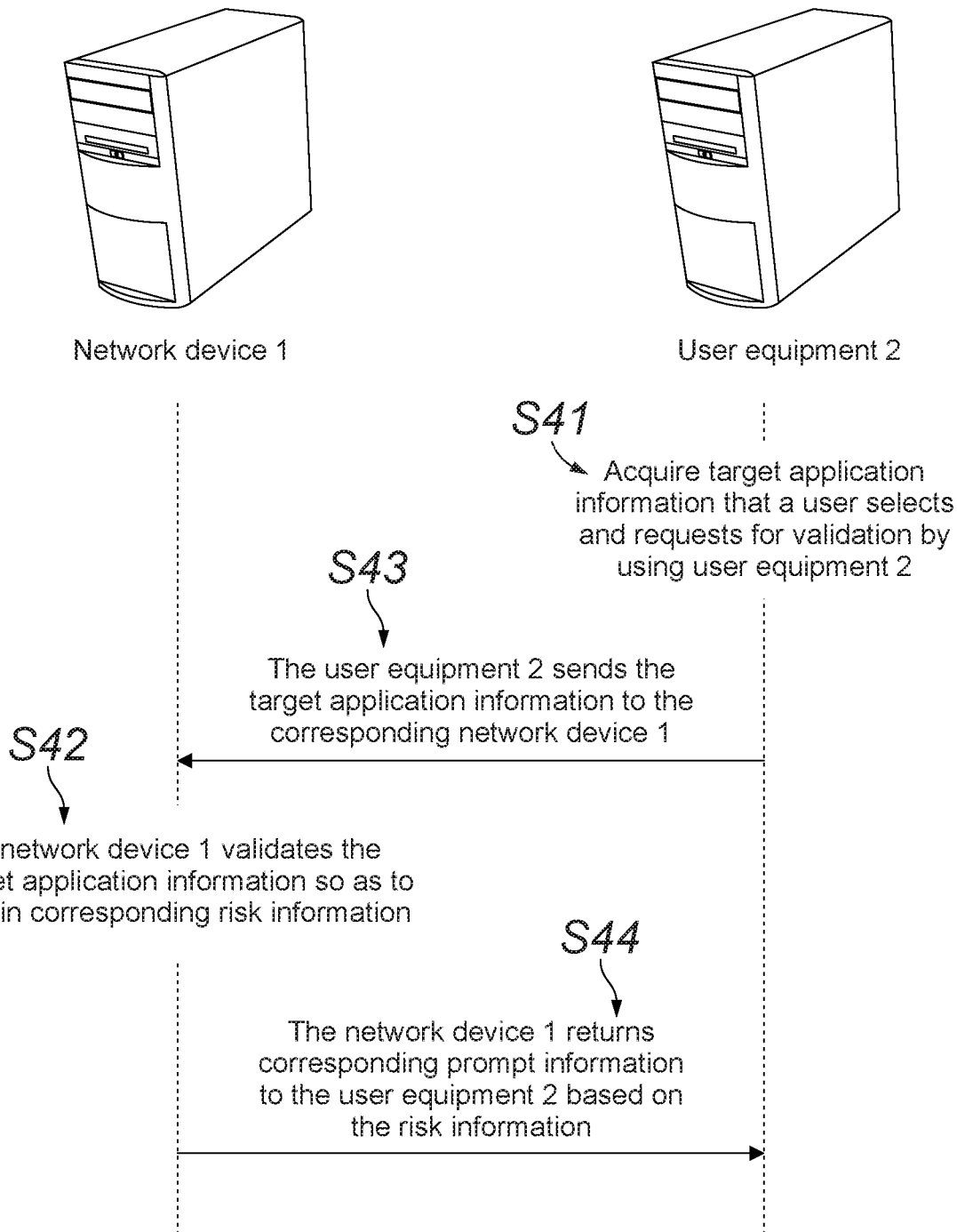
FIG. 4 shows a flowchart of a method for application information risk management on a network device side and a user equipment side based on a preferred embodiment of the present application.

Specifically, in step S31, the network device 1 acquires the target application information that the user selects and requests for validation by using the user equipment 2 (referring to FIG. 4). Here, the network device 1 includes various intelligent terminals, such as various cloud servers or server clusters. The user equipment 2 includes various intelligent terminal devices, such as various personal computers and smartphones. Here, the application information includes, but is not limited to, an SMS message, a WeChat message, an e-mail, or other information transferred based on a specific application program in the user equipment 2. Here, the target application information acquired by the network device 1 comes from the corresponding user equipment 2. Preferably, the target application information is autonomously selected by the user from application information in a target application of the user equipment 2. For example, the user can copy the target application information to a text box, and select to submit the target application information. Then the user equipment 2 sends the target application information to the corresponding network device 1. As another example, the user can directly select and submit the target application information in an application. Here, preferably, the network device 1 acquires the target application information sent by the user equipment 2 in an encrypted transmission manner. For example, the target application information is an SMS message. When the user enters an SMS application interface of the user equipment 2 such as a mobile phone, the user directly selects a suspected Smishing message from various displayed SMS messages, and determines one or more pieces of target application information on which risk validation is to be performed. Then, the target application information acquiring apparatus 11 of the network device 1 acquires the target application information selected by the user and a corresponding validation request.

Here, the target application information acquired by the network device 1 can be in an original form of the target application information acquired by the user equipment 2. For example, if the target application information is an SMS message, the target application information acquired by the network device 1 can be in the form of an SMS message text displayed on the SMS application interface of the user equipment 2. In addition, the user equipment 2 can first analyze the original application information received by the user equipment 2 or extract information from the original application information. For example, the user equipment 2 extracts a keyword from an SMS message based on a category and sends the extracted keyword to the network device 1. As such, target application information to be validated can be preliminarily analyzed and sorted out, and a volume of data transmitted between devices is reduced.

In addition, when acquiring the target application information, the network device 1 can correspondingly acquire related attribute information of the target application information, such as sender information of the target application information or user guide information of the target application information.

Afterwards, in step S32, the network device 1 validates the target application information to obtain the corresponding risk information. Here, in the present application, the network device 1 performs a risk validation analysis on the target application information by using the network device 1. Here, a risk of the target application information can include a direct risk imposed on user privacy security and user equipment security, and can further include a potential risk imposed on the user by junk application information such as a false advertisement. For validating the target application information, the target application information and the related attribute information can be comprehensively considered or evaluated by means of classification. Here, specific validation methods can be flexibly selected and combined based on actual needs. For example, the target application information can be validated and analyzed based on a pre-existing validation database. As another example, simulation execution can be performed on the user guide information of the target application information in a sandbox environment to identify whether the target application information includes risk information. For instance, security of the target application information can be validated for a plurality of times by combining a plurality of validation methods. For example, the target application information is validated by separately using the methods described in the two previous examples to improve the accuracy of the finally obtained risk information. Here, the risk information can include determining information that there is a risk or determining information that there is no risk. Further, preferably, the determining information that there is a risk can be specifically classified and graded based on the content of the risk and the adverse consequence caused by the risk. For example, if the target application information includes content such as a phishing website, a Trojan horse, or a rogue base station and the like, a risk value of the target application information is set to 99%, or the target application information is defined to be at a high-risk level.

Afterwards, in step S33, the network device 1 returns, based on the risk information, the corresponding prompt information to the user equipment 2. Here, preferably, the network device 1 generates the corresponding prompt information based on the risk information obtained through validation, and returns the prompt information to the user equipment 2. For example, when the risk information is the determining information that there is a risk, such as when the risk information is that a target SMS message is false information, the corresponding risk warning information is generated. The content of the risk warning information can include a highlighting of an SMS message with a risk warning in the user equipment 2, a specific prompt SMS message, or prompt information in another form, or even a direct process of the SMS message as a junk SMS message by the user equipment 2, etc. As another example, when the risk information is the determining information that there is no risk, the corresponding validation security information can be sent to the user equipment 2.

Herein, in the present application, the target application information that the user selects and requests for validation is validated by using the network device 1, and the prompt information corresponding to the risk information obtained through validation is returned to the corresponding user equipment 2. Here, the user can directly select one or more pieces of target application information from a corresponding application information interface of the user equipment without the need to jump to a third-party application operation. In addition, the user can autonomously determine some or all to-be-uploaded target application information. Therefore, a user's participation level in user privacy information management is improved, and a probability of leakage of the user's private information is reduced. Also, with a flexible selection, a volume of data transmitted between the devices can be reduced, so that a volume of validation data that the network device processes is accordingly reduced, and overall application information risk management efficiency is improved.

In a preferred embodiment, step S32 includes step S321 (not shown) and step S322 (not shown). In step S321, the network device 1 performs match querying in a corresponding validation database based on related attribute information of the target application information. In step S322, the network device 1 determines the corresponding risk information based on record information that is in the validation database and that matches the related attribute information.

Specifically, in step S321, the network device 1 performs match querying in the corresponding validation database based on the related attribute information of the target application information. Here, the validation database is preferably an SMS message template library, a phishing website library, a Trojan virus library, etc. The SMS message template library includes an SMS message that is determined as a template, and that is collected by the network device 1 and is of a high historical risk factor, such as a determined Smishing message, or a derived SMS message template with relatively high similarity inferred based on a pre-known Smishing message. The phishing website library, the Trojan virus library, etc. include information about a website that is collected by the network device 1 and that is determined as a phishing website, or information about a file determined to include a Trojan virus. The information in the previous phishing website library and the Trojan virus library can be directly extracted from the application information in each user equipment 2, or can be existing data from another database, or a third-party device. Here, the related attribute information includes any information that is associated with the target application information, for example, sender information of the target application information, the content information of the target application information, user guide information of the target application information, etc. Here, based on the types of the different validation databases, corresponding match querying can be performed on appropriate information selected from the related attribute information of the target application information. For example, when the validation database is a phishing website library, the user guide information of the target application information can be selected. For example, a target SMS message includes information about a website, and math querying is performed on the information. As another example, if the validation database is the SMS message template library, the content of the target application information is selected, and match querying is performed on the content. Here, preferably, when a plurality of validation database types are preconfigured on the network device 1, one or more validation databases can be selected and used as a reference database based on needs, for example, based on a user's selection, or based on an intelligent decision of a type of the target application information. In addition, preferably, each validation database can be graded based on the risk level corresponding to the application information, and a validation database at a specific grade is selected for the target application information based on the grade, or validation databases at a plurality of grades are selected for successively validating the target application information.

Here, a person skilled in the art should understand that the SMS message template library, the phishing website library, and the Trojan virus library are only examples, and an existing database or a future database that can be used for target application information validation and is applicable to the solution shall fall within the protection scope of the present application, and is incorporated here by reference.

Afterwards, in step S322, the network device 1 determines the corresponding risk information based on the record information that is in the validation database and that matches the related attribute information. Here, if the record information that matches the related attribute information is identified in the corresponding validation database, for example, if a target SMS message includes information about a website, and its corresponding record in the phishing website library is a phishing website. As another example, if the above-mentioned text content of the target SMS message is consistent with the content of a Smishing message template in the SMS message template library, the risk information corresponding to the target application information can be determined, for example, determined as the determining information that there is a risk, or further, the risk information includes corresponding risk level information.

In addition, when the validation database does not include the record information that matches the related attribute information, the target application information can be inferred to be security information with a relatively low risk based on needs, and corresponding validation security information is returned to the user equipment 2. Alternatively, another validation database or even another validation method is selected for risk validation, and corresponding risk information is provided. For example, when no corresponding record information can be matched by using the SMS message template library, match queries are further performed based on the phishing website library. As another example, when no corresponding record information can be matched in all or some predetermined validation databases, matching can be performed in another validation method, for example, matching with an SMS message/phone number library of a financial institution. For example, simulation execution can be performed on the user guide information of the target application information in a sandbox environment to identify whether the target application information includes risk information.

Preferably, the related attribute information includes at least one of the following: sender information of the target application information, content information of the target application information, or user guide information of the target application information.

Here, specifically and preferably, when acquiring the target application information, the network device 1 acquires the corresponding related attribute information at the same time. The related attribute information includes the sender information of the target application information, for example, a device number of a sender of an SMS message, a cell phone number, or an institution-specific number, or e-mail address information of a sender of an e-mail. The related attribute information further includes the content of the target application information, for example, text content of an SMS message or body content of an e-mail, and the like. The related attribute information further includes the user guide information. The user guide information includes any information instructing a user to perform a related operation. For example, a website hyperlink provided to the user or download address information provided to the user, and the like. Here, different validation and analysis operations are performed based on different specific contents of the related attribute information, for example, different validation databases are selected for different related attribute information to perform match querying.

Here, a person skilled in the art should understand that the sender information of the target application information, the content information of the target application information, or the user guide information of the target application information are only examples, and related attribute information of other existing or future target application information that is applicable to the solution shall fall within the protection scope of the present application, and is incorporated here by reference.

In a preferred embodiment (referring to FIG. 3), the related attribute information includes the user guide information of the target application information. Step S32 further includes step S323 (not shown). In step S323, when no record information that matches the user guide information is identified in the validation database, the network device 1 simulates execution of the target application information based on the user guide information to obtain the corresponding risk information.

Specifically, in this embodiment, when the related attribute information includes the user guide information of the target application information, if no record information that matches the user guide information is identified in the validation database, preferably, specific simulation execution is performed on the user guide information. Here, considering that a simulation execution process can have a security risk, the network device 1 can be disposed in a sandbox environment to perform a simulation experiment. For example, when the user guide information is a download link or website information, the network device 1 extracts the user guide information, and runs a browser or another corresponding program in a preconfigured sandbox environment to open the foregoing web site URL information or the downlink link to perform the operation indicated by the user guide information. Further, the security problem in an execution operation process is analyzed, or the execution result of the simulation execution is further determined and analyzed to obtain the corresponding risk information. For example, if a website link corresponding to the user guide information is opened through simulation execution, and the result corresponds to a phishing website, it can be inferred that the target application information is risky, and the corresponding risk information is determined. Here, changes caused by an operation executed in the sandbox environment are subsequently deleted. In addition, possible risks that can be brought by executing a program in the virtual execution environment cause no actual damage to related devices such as the network device 1.

In addition, based on a risk source, for example, phishing website information, a Trojan virus, or a security risk of an SMS message text, risk information extraction and classification can be performed on relatively high-risk target application information determined through the simulation execution, so as to update information about the corresponding validation database, and feedback the risk information to different financial institutions based on risk types.

In this embodiment, the network device 1 performs match querying in the corresponding validation database based on the related attribute information of the target application information. For target application information that does not match the corresponding record information, the network device 1 can further simulate execution of the corresponding user guide information to determine the corresponding risk information. Therefore, risk information determining accuracy is ensured through a multi-level determining manner. As such, the user can perform effective processing based on the prompt information corresponding to high-accuracy risk information.

Preferably, in step S323, when no record information that matches the user guide information is identified in the validation database, the network device 1 simulates acquiring, based on the user guide information, target information that is in the target application information and that the user is guided to acquire; and validates the correspondence between the target information and the target application information to obtain the corresponding risk information.

Specifically and preferably, the target information that is in the target application information and is acquired by a guided user is first obtained by means of simulation based on the guided user information. Here, the target information includes a corresponding result that the network device 1 points to by executing the guide user information through simulation. For example, the target information can be a webpage that the user is guided to open, or can be a file that the user is guided to download. Then, the network device 1 validates the correspondence between the target information and the target application information to obtain the corresponding risk information. Here, the risks brought by the target information include a direct risk imposed on user privacy security and user equipment security, for example, a downloaded file includes a virus. The risks brought by the target information also include a potential risk brought by some spam information, for example, when an opened website is a false advertisement website, some damage can be caused if the user performs a corresponding operation based on instruction information on the website. Here, the correspondence between the target information and the target application information is determined in order to determine the relevance of the target information and the target application information. Generally speaking, there exists high-risk target application information such as a false SMS message with the purpose to deceive the user into performing an operation against his will or unintentionally performing an unfavorable operation. Therefore, there is a relatively high possibility that the target information corresponding to such target application information is inconsistent with or does not match the target application information. This is an important basis for validating the correspondence in the present application. The correspondence validation between the target information and the target application information can include checking whether sender information of the target information is consistent with the sender information of the target application information; checking whether content of the target information is associated with the content of the target application information; or checking whether sandbox operation information of the target information matches the target application information.

Here, a person skilled in the art should understand that the previous methods for validating the correspondence between the target information and the target application information are only examples, and an existing or a future method that is for validating the correspondence between the target information and the target application information and that is applicable to the solution shall fall within the protection scope of the present application, and is incorporated here by reference.

More preferably, the correspondence validation between the target information and the target application information includes at least one of the following: checking whether sender information of the target information is consistent with the sender information of the target application information; checking whether content of the target information is associated with the content of the target application information; or checking whether sandbox operation information of the target information matches the target application information.

Specifically, the correspondence validation between the target information and the target application information includes checking whether the sender information of the target information is consistent with the sender information of the target application information. If the sender information of the target information is consistent with the sender information of the target application information, it can be inferred that the target information matches the target application information. Therefore, it can be inferred from the validation that the target application information has high security and low risk. Otherwise, it is inferred that the target information does not match the target application information. It can be inferred from the validation that the target application information has a low security and a high risk. Here, for example, the target application information is an SMS message. If a sender of the SMS message is a number of a mobile operator, the content of the SMS message is about providing free calls, and user guide information is a webpage link of the operator, and if the acquired target information is a related webpage of the mobile operation indeed, it is considered that the sender of the target information is consistent with the sender of the SMS message, and it can be inferred that the target information matches the target application information. On the contrary, if an irrelevant webpage is opened after clicking the link, it can be inferred that the target information does not match the target application information. Here, preferably, if the sender information is inconsistent, it can be further determined whether the sender of the target application information is a rogue base station that dedicatedly sends false information. If so, it can be inferred that the application information sent by the sender is false information. In addition, the network device 1 can further record information about the rogue base station, and warn the related user equipment 2.

The correspondence validation between the target information and the target application information further includes checking whether the content of the target information is associated with the content of the target application information. Here, if the content of the target information matches the content of the target application information, it is considered that the correspondence between the target information and the target application information is relatively high, and it is inferred that the security of target application information is relatively high, and the risk is low. On the contrary, it is inferred that the target application information is less secure and has a higher risk. Here, for example, the target application information is an SMS message. If the content of the SMS message is a link about shopping mall discount information, but an irrelevant payment website is opened after clicking the link, it is inferred that the content of the target information is unrelated to the content of the target application information, and the target information can be potentially dangerous.

The correspondence validation between the target information and the target application information further includes checking whether the sandbox operation information of the target information matches the target application information. Here, if the sandbox operation information of the target information matches the target application information, the target application information is relatively secure with a lower risk. On the contrary, if the sandbox operation information of the target information does not match the target application information, it can be inferred that the target application information has low security and high risk. Here, for example, the target application information is an SMS message. When the target information is a downloaded application corresponding to a download link in the SMS message, if the downloaded application is installed or run in the sandbox, and if a specific operation step is different from what described in the target application information, or a result obtained by executing the application is different from what described in the target application information, it can be inferred that the sandbox operation information of the target information does not match the target application information, and there is a high security risk.

Here, a person skilled in the art should understand that the previous methods for validating the correspondence between the target information and the target application information are only examples, and an existing or a future method that is for validating the correspondence between the target information and the target application information and that is applicable to the solution shall fall within the protection scope of the present application, and is incorporated here by reference.

In a preferred embodiment (referring to FIG. 3), the target application information includes an SMS message, and the method further includes step S34 (not shown). In step S34, the network device 1 sends rogue base station prompt information to nearby user equipment of the user equipment when the risk information is that the SMS message is false information. A distance between the nearby user equipment and the user equipment is less than or equal to a predetermined device distance threshold.

Specifically, here, the rogue base station is a pseudo base station, and usually comprises a host and a laptop. The rogue base station can be configured to search for the information about a subscriber identity module (SIM) card in an area within a certain radius of the base station by using a device such as an SMS message blasts device, an SMS message sender, or the like. The rogue base station forcibly sends an SMS message such as a Smishing message or an advertisement SMS message to the user's mobile phone by disguising itself as a base station of a carrier and fraudulently using a cell phone number of another user. In this embodiment, the target application information includes SMS message information. If the risk information of the target application information obtained through the validation by the network device 1 includes the SMS message being false information, and it can be further inferred that the false information is sent by a corresponding rogue base station, the location information of the rogue base station can be determined, or a movement track of the rogue base station can be determined to infer the location information of the rogue base station. In addition, the rogue base station prompt information sending apparatus sends the rogue base station prompt information to the nearby user equipment of the user equipment, wherein the distance between the nearby user equipment and the user equipment is less than or equal to a predetermined device distance threshold information. The nearby user equipment includes various mobile intelligent terminal devices, and preferably, includes a device with a mobile communication function, for example, a terminal device that can receive an SMS message, such as a mobile phone, or a tablet computer with an SMS message receiving/sending function. Here, the predetermined device distance threshold can be set based on the location information of the rogue base station and the coverage of sending the SMS message. Here, the rogue base station prompt information can be sent to the nearby user equipment when the network device 1 first acquires and determines the information about the rogue base station. Alternatively, each time when the SMS message is determined as false information, the rogue base station prompt information can be sent to the nearby user equipment at the same time. Here, if a corresponding positioning function is enabled on the nearby user equipment, for example, a GPS (Global Positioning System, global positioning system) function of a mobile phone is enabled, the network device 1 can search for and obtain corresponding latitude and longitude information of the mobile phone. In this case, if the distance between the nearby user equipment and the user equipment is less than or equal to the predetermined device distance threshold, the rogue base station prompt information is sent to the nearby user equipment.

In this embodiment, when the risk information includes the SMS message information being false information, the network device 1 sends the rogue base station prompt information to the nearby user equipment of the user equipment 2. When the false information corresponds to a rogue base station, a warning can be sent to other user equipment that is in the coverage area of the rogue base station and that can receive the Smishing message to reduce and prevent more risks caused by the false information sent by the rogue base station. Specifically, when other user equipment use a target application, the network device 1 can send information about a rogue base station exists near the network device 1, and the network device 1 can directly push a warning with permission of other user equipment.

FIG. 4 shows a flowchart of a method for application information risk management on a network device side and a user equipment side based on a preferred embodiment of the present application. In step S41, user equipment 2 acquires target application information that a user selects and requests for validation by using the user equipment 2. In step S43, the user equipment 2 sends the target application information to a corresponding network device 1. In step S42, the network device 1 validates the target application information to obtain corresponding risk information. In step S44, the network device 1 returns corresponding prompt information to the user equipment 2 based on the risk information. Here, step S42 and step S44 are the same or basically the same as step S32 and step S33 shown in FIG. 3. Details are not described here again, and are incorporated here by reference.

Specifically, in step S41, the user equipment 2 acquires the target application information that the user selects and requests for validation by using the user equipment 2. Here, preferably, the target application information is directly determined based on an autonomous selection operation of the user. Here, application information such as an SMS message, a WeChat message, or an e-mail includes massive user privacy information. Therefore, if all the information is uploaded by a third-party application, a risk of information leakage is increased. Therefore, in the present application, preferably, the user can autonomously select one or more pieces of target application information that actually needs to be sent to the network device for validation. Here, further, preferably, the user can directly perform a selection operation on an operating interface of a target application corresponding to the target application information in the user equipment 2. For example, if the target application information is an SMS message, the user can directly select a suspected Smishing message when entering the SMS application, so that the need to jump to another third-party application interface is avoided. Here, a response operation for an instruction of the user for selection and validation request can be implemented by executing an independent application program loaded to the network device 1, or by running a corresponding plug-in that matches the target application such as the SMS application.

Afterwards, in step S43, the user equipment 2 sends the target application information to the corresponding network device 1. Here, the target application information sent to the network device 1 can be in an original form of the target application information acquired by the user equipment 2. For example, if the target application information is an SMS message, the target application information acquired by the network device 1 can be in the form of an SMS message text displayed on the SMS application interface of the user equipment 2. In addition, the user equipment 2 can first analyze original application information received by the user equipment 2 or extract information from the original application information. For example, the user equipment 2 extracts a keyword from an SMS message based on a category and sends the extracted keyword to the network device 1. As such, the user equipment 2 can first preliminarily analyze and sort out target application information to be validated, and reduce a volume of data transmitted between devices. In addition, when sending the target application information, the user equipment 2 can further send, to the network device 1, related attribute information corresponding to the target application information, such as sender information of the target application information or user guide information of the target application information, so as to subsequently perform risk validation operations on the target application information in the network device 1 in a plurality of manners. Here, preferably, the user equipment 2 sends the target application information to the network device 1 in an encrypted transmission manner.

Afterwards, in step S42, the network device 1 validates the target application information to obtain the corresponding risk information. In step S44, the network device 1 returns the corresponding prompt information to the user equipment 2 based on the risk information. Here, preferably, the prompt information received by the user equipment 2 is corresponding prompt information generated by the network device 1 based on the risk information obtained through validation. For example, when the risk information is determining information that there is a risk, such as when the risk information is that a target SMS message is false information, the corresponding risk warning information is generated. The content of the risk warning information can include a highlighting of an SMS message with a risk warning in the user equipment 2, a specific prompt SMS message, or prompt information in another form, or even a direct process of the SMS message as a junk SMS message by the user equipment 2, etc. As another example, when the network device 1 determines that the risk information is determining information that there is no risk, the user equipment 2 acquires corresponding validation security information. Further, here, preferably, the user can choose to adopt the prompt information sent by the network device 1 to perform subsequent processing on the application information such as an SMS message of the user, or choose not to adopt the prompt information and retain the target application information. As such, a user's right for processing privacy-related information of the user is fully respected. In addition, prompt information content can be automatically executed based on predetermined settings made by the user when the corresponding prompt information is obtained. For example, the user can perform pre-selecting. As such, after the network device 1 performs risk validation, if a risk of the target application information is relatively high and reaches a predetermined level, the target application information is automatically deleted. Therefore, after the user equipment 2 receives prompt information that meets a condition, a corresponding instruction operation can be automatically performed, and the user does not need to be inquired. To sum up, the automatic operation does not go against the user's will, but also the result of user participation in the operation.

Here, the user equipment 2 sends the target application information selected by the user to the corresponding network device 1 for validation, and receives the prompt information that is returned by the network device 1 and that is based on the risk information of the target application information. As such, the user equipment cooperates with the network device 1 to implement risk management on the application information.

Preferably, the method further includes step S45 (not shown) and step S46 (not shown). In step S45, the user equipment 2 performs a risk pre-analysis on the application information received by the user equipment 2. In step S46, the user equipment 2 displays, in a corresponding application, one or more pieces of application information that are at risk acquired through the risk pre-analysis. In step S41, the user equipment 2 acquires the target application information that the user selects from the one or more pieces of application information and requests for validation by using the user equipment 2.

Specifically, target application information with a relatively high risk, such as a false SMS message, usually cannot be easily recognized. Therefore, in order to facilitate the autonomous selection of the target application information by the user, improve the probability that the target application information autonomously selected by the user is determined as high-risk application information, and improve the efficiency of performing target application information risk validation by the network device 1 subsequently, preferably, in step S45, the user equipment 2 can perform the risk pre-analysis on the application information received by the user equipment 2, and then a corresponding prompt assistance is provided to the user based on the result of the risk pre-analysis. Here, the user equipment 2 can acquire and store in advance some related information about application information that is recently collected and that is with a relatively high risk. For example, a recent collection database of Smishing message sender numbers is pre-acquired, and then based on information of the database, a risk pre-analysis is performed on an SMS message received by the user equipment 2. Here, data information that is used as pre-analysis reference data can be from the corresponding network device 1, for example, from a collection of related information about recent validation database information corresponding to the network device 1, for example, validation database information within one month. As another example, a list of recent risky data in a current region can be cached in the user equipment 2, and then the application information acquired by the user equipment 2 is compared with the data list. Here, a preliminary evaluation analysis of the application information can be performed without increasing an operation burden of the user equipment 2, so as to effectively prompt the user.

Afterwards, in step S46, the user equipment 2 displays, in a corresponding application, one or more pieces of application information that are at risk acquired through the risk pre-analysis. Here, the result of the risk pre-analysis can be effectively displayed on a target application interface, for example, shown in a highlighted manner. For example, the application information that is at risk can be displayed in a manner including but not limited to different colors or fonts, or specific prompting markers. As another example, the user is prompted by a prompt window. Afterwards, in step S41, the user equipment 2 acquires the target application information that the user selects from the one or more pieces of application information and requests for validation by using the user equipment 2. Here, the result of the risk pre-analysis is an operation prompt for the user. However, in practice, the user can select, based on the user's will, one or more of the prompted application information of the indicated risk, or select no application information.

In this embodiment, the user equipment 2 can further perform a risk pre-analysis on the received application information, to guide the user to select target application information, thereby helping the user to efficiently identify some application information with higher risk to improve user experience.

It is apparent to a person skilled in the art that the present application is not limited to the details of the previous example embodiments, and the present application can be implemented in another specific form without departing from the spirit or essential feature of the present application. Therefore, the embodiments should be considered as illustrative and not restrictive in every aspect, and the scope of the present application is limited by the appended claims, rather than the above description. Therefore, the present application covers all changes within the meaning and the scope of the equivalent elements of the claims. Any reference numeral in the claims should not be considered as a limitation on the related claim. In addition, it is clear that the word "include" does not exclude another unit or step, and the singular does not exclude the plural. A plurality of units or apparatuses described in the apparatus claims can also be implemented by one unit or apparatus by using software or hardware. The words such as "first" and "second" are used to indicate names instead of any particular order.

Figure 5:
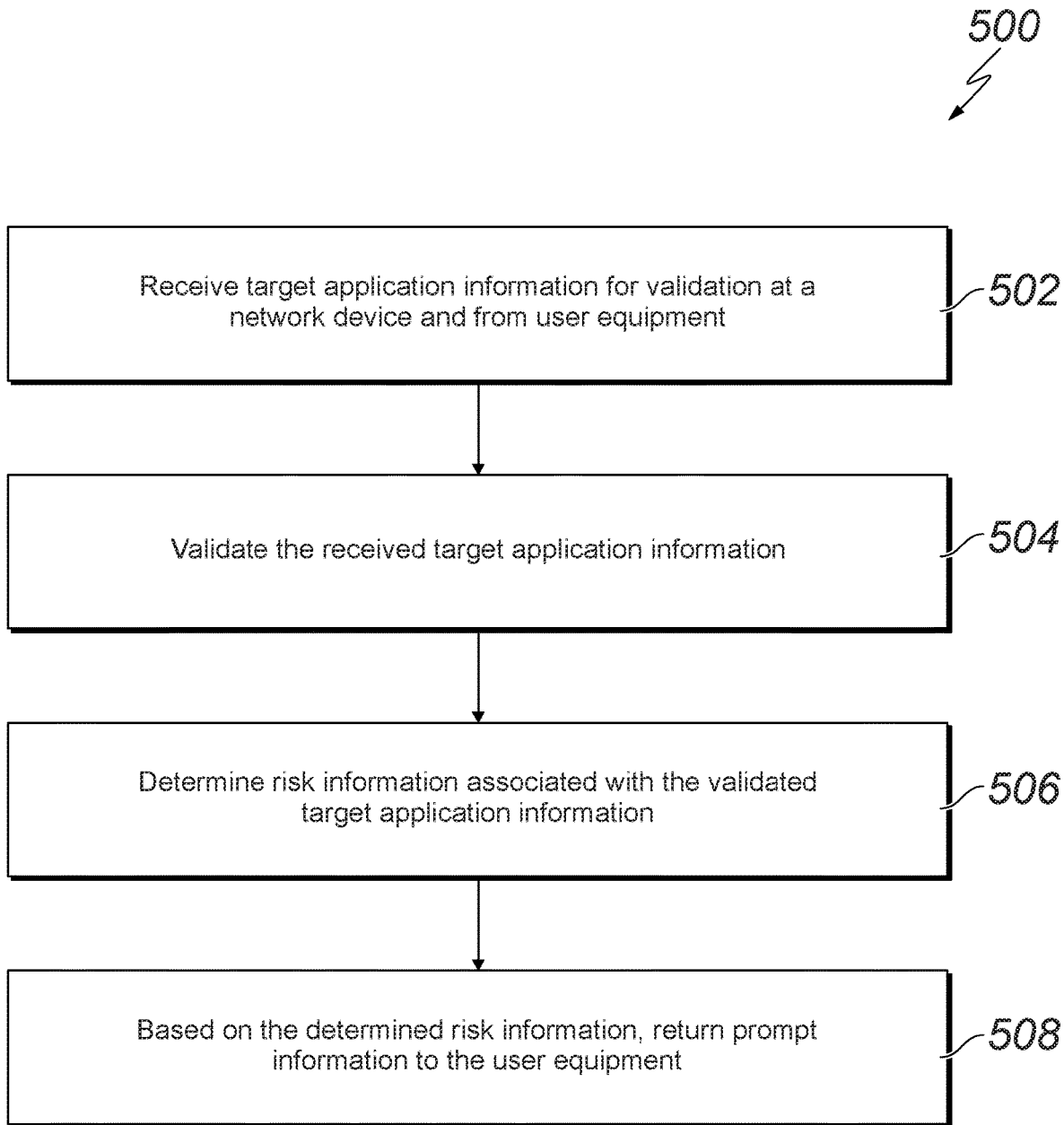
FIG. 5 is a flowchart illustrating an example of a computer-implemented method for application information risk management, according to an implementation of the present disclosure.

FIG. 5 is a flowchart illustrating an example of a computer-implemented method 500 for application information risk management, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, target application information for validation is received at a network device from user equipment. In some implementations, the user equipment receives one or more pieces of application information and performs a risk pre-analysis on the received one or more pieces of application information. One or more pieces of risky application information identified by the performed risk pre-analysis is displayed in a software application executing on the user equipment. The target application information is selected on the user equipment from the one or more pieces of risky application information. The target application information is sent to the network device for validation. Prompt information is received from the network device. The prompt information is based on the determined risk information associated with the received target application information. In some implementations, the target application information comprises a Short Message Service (SMS) message. When the risk information is that the SMS message is false information, rogue base station prompt information is sent to particular user equipment associated with the user equipment when a distance between the particular user equipment and the user equipment is less than or equal to a predetermined device distance threshold. From 502, method 500 proceeds to 504.

At 504, the received target application information is validated. In some implementations, the validation of the received target application information includes: 1) performing match querying in a validation database based on related attribute information of the target application information, and where the related attribute information includes at least one of sender information, content, or user guide information and 2) the risk information is determined based on record information that is in the validation database and that matches the related attribute information. In some implementations, the validation of the received target application information also includes, when no record information matching the user guide information is identified in the validation database, simulating, based on the user guide information, execution of the target application information to obtain the risk information. The simulation also includes, when no record information matching the user guide information is identified in the validation database: 1) simulating acquisition, based on the user guide information, of target information in the target application information; 2) guiding a user to acquire the target information; and 3) validating a correspondence between the acquired target information and the target application information to obtain the risk information. In some implementations, validating the correspondence between the acquired target information and the target application information includes at least one of: 1) checking whether the sender information of the target information is consistent with the sender information of the target application information; 2) checking whether content of the target information is associated with the content of the target application information; or 3) checking whether sandbox operation information of the target information matches the target application information. From 504, method 500 proceeds to 506.

At 506, risk information associated with the validated target application information is determined. From 506, method 500 proceeds to 508.

At 508, based on the determined risk information, prompt information is returned to the user equipment. After 508, method 500 stops.

Implementations of the subject matter described in this specification can be implemented so as to realize particular advantages or technical effects. For example, implementations of the subject matter permits increased data security. Target application information for validation is sent from user equipment to a network device, with prompt information based on determined risk information returned to the user equipment in response. In some implementations, the user equipment receives one or more pieces of application information and performs a risk pre-analysis on the received one or more pieces of application information. In some implementations, transmitted information comprises a Short Message Service (SMS) message containing rogue base station prompt information to particular user equipment associated with the user equipment when a distance between the particular user equipment and the user equipment is less than or equal to a predetermined device distance threshold.

The described methodology can ensure the efficient usage of computer resources (for example, processing cycles, network bandwidth, and memory usage), through the validation of received target application information. At least these actions can minimize or prevent waste of available computer resources with respect to preventing undesired/invalid transactions. Instead of users needing to verify data with additional transactions, transactions can be depended upon as valid.

In some implementations, elements of a graphical user interface associated with the described software application executing on the user equipment can be positioned to be least obtrusive for a user. For example, the elements can be positions in a way to obscure the least amount of data and to avoid covering any critical or often-used graphical user interface elements).

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A method for application information risk management on a network device side, the method comprising:
    receiving a user input selecting a target application information from a plurality of application information;
    processing the target application information for a validation request;
    transmitting the target application information to a system configured to validate the target application information and to determine a corresponding risk information;
    receiving, from the system, a prompt information based on the corresponding risk information;
    processing the prompt information to generate a risk warning information; and
    displaying the risk warning information within a graphical user interface, wherein the target application information comprises an SMS message selected by a user, and wherein the risk warning information provides an indication of a risk the selected SMS message poses to the user.

2. The method of claim 1, wherein processing the target application information comprises removing a portion of the target application information to reduce a transmission data volume.

3. The method of claim 1, wherein the target application information comprises a potentially harmful data received by a user device.

4. The method of claim 1, further comprising:
    when the corresponding risk information indicates that the SMS message comprises false information, sending a rogue base station prompt information to a second user device nearby a first user device, wherein a distance between the second user device and the first user device is less than or equal to a predetermined device distance threshold.

5. The method of claim 1, wherein the SMS message comprises a suspected smishing message.

6. The method of claim 1, further comprising:
    retrieving a related attribute information comprising at least one of the following: a sender information of the target application information, a content of the target application information, a user guide information of the target application information; and
    transmitting the related attribute information to the system configured to validate the target application information.

7. An apparatus for application information risk management, the apparatus comprising one or more computers, and one or more computer memory devices interoperably coupled with the one or more computers and having tangible, non-transitory, machine-readable media storing instructions that, when executed by the one or more computers, perform operations comprising:
    receiving a user input selecting a target application information from a plurality of application information;
    processing the target application information for a validation request;
    transmitting the target application information to a system configured to validate the target application information and to determine a corresponding risk information;
    receiving, from the system, a prompt information based on the corresponding risk information;
    processing the prompt information to generate a risk warning information; and
    displaying the risk warning information within a graphical user interface, wherein the target application information comprises an SMS message selected by a user, and wherein the risk warning information provides an indication of a risk the selected SMS message poses to the user.

8. The apparatus of claim 7, wherein processing the target application information comprises removing a portion of the target application information to reduce a transmission data volume.

9. The apparatus of claim 7, wherein the target application information comprises a potentially harmful data received by a user device.

10. The apparatus of claim 7, wherein the operations further comprise:
    when the corresponding risk information indicates that the SMS message comprises false information, sending a rogue base station prompt information to a second user device nearby a first user device, wherein a distance between the second user device and the first user device is less than or equal to a predetermined device distance threshold.

11. The apparatus of claim 7, wherein the SMS message comprises a suspected smishing message.

12. The apparatus of claim 7, wherein the operations further comprise:
    retrieving a related attribute information comprising at least one of the following: a sender information of the target application information, a content of the target application information, a user guide information of the target application information; and
    transmitting the related attribute information to the system configured to validate the target application information.

* * * * *